(12) United States Patent
Peters

(10) Patent No.: US 7,017,075 B1
(45) Date of Patent: Mar. 21, 2006

(54) RECOVERING FROM VIDEO DRIVER ERRORS

(75) Inventor: Geoffrey W. Peters, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/569,794

(22) Filed: May 12, 2000

(51) Int. Cl.
*G06F 11/00* (2006.01)

(52) U.S. Cl. .......................................... 714/15; 714/2

(58) Field of Classification Search ............ 714/15–16, 714/2, 47, 48, 20, 23
See application file for complete search history.

(56) References Cited

U.S. PATENT DOCUMENTS

| | | | | |
|---|---|---|---|---|
| 4,482,992 A * | 11/1984 | Shimizu et al. | ............. | 369/221 |
| 5,212,723 A * | 5/1993 | Griesshaber | ................ | 380/213 |
| 5,642,171 A * | 6/1997 | Baumgartner et al. | ...... | 348/515 |
| 5,732,282 A * | 3/1998 | Provino et al. | ............. | 719/324 |
| 5,784,527 A * | 7/1998 | Ort | ............................. | 386/111 |
| 5,802,365 A * | 9/1998 | Kathail et al. | ............... | 719/321 |
| 5,930,251 A * | 7/1999 | Murakami et al. | ..... | 370/395.65 |
| 5,941,997 A * | 8/1999 | Greaves | ....................... | 714/48 |
| 5,978,911 A * | 11/1999 | Knox et al. | .................... | 713/1 |
| 6,141,785 A * | 10/2000 | Hur et al. | .................... | 714/748 |
| 6,226,768 B1 * | 5/2001 | Chujo et al. | ................ | 714/746 |
| 6,246,829 B1 * | 6/2001 | Nakagawa | ................... | 386/95 |
| 6,266,788 B1 * | 7/2001 | Othmer et al. | ................ | 714/38 |
| 6,268,888 B1 * | 7/2001 | Cahill, III | ................... | 348/614 |
| 6,275,930 B1 * | 8/2001 | Bonamico | ....................... | 713/1 |
| 6,317,845 B1 * | 11/2001 | Meyer et al. | ................. | 714/23 |

* cited by examiner

*Primary Examiner*—Dieu-Minh Le
(74) *Attorney, Agent, or Firm*—Trop, Pruner & Hu, P.C.

(57) ABSTRACT

A host processor-based system may communicate with a video capture device. If an error occurs in connection with a device driver for the video capture device, software attempts to automatically recover the driver without necessitating rebooting of the host processor-based system. The recovery software may also be responsible for providing error messages as video frames through an established video transmission protocol. As the recovery software progresses, different error recovery status messages may be sent for display in place of the missing video frames.

29 Claims, 8 Drawing Sheets

RECOVERING FROM VIDEO DRIVER ERRORS

BACKGROUND

This invention relates generally to processor-based systems and particularly to such systems that receive a video stream from a video source such as a video camera or other video capture device.

A video capture device provides streaming video using a digital imaging array to capture video and to generate a stream of video that may be transmitted to a host processor-based system. The video capture device and the host processor-based system may be coupled in a tethered arrangement with a connecting cable. In one example, a video capture device and a host processor-based system may be coupled over a Universal Serial Bus connection. In other cases, it is also possible for the video capture device to communicate with the host processor-based system over a wireless connection.

The host processor-based system may store application programs that provide graphical user interfaces for the user to view, manipulate and store the video captured by the video capture device. Generally, the interface between the application programs on the host processor-based system and the video capture device is a software driver. If this driver fails for any reason, it may be necessary to reboot the entire processor-based system. This results in a very awkward operation of the computer system.

The video driver may encounter problems for any number of reasons. The application software on the host processor-based system may be unable to establish a connection with the video capture device. The software on the host processor-based system may not receive a video stream. The software may receive a video stream but all the frames received may be blank. A hot plugging status problem may arise because the video capture device is either unplugged during system reboot or a new video capture device is plugged in and the driver reports an incorrect state. The driver may not be installed correctly. The user may not have plugged in the video capture device. Thus, in a number of cases, video driver failures may occur.

It would be highly desirable to operate a host processor-based system with a video capture device so that driver failures can be overcome without requiring that the host processor-based system be rebooted.

DETAILED DESCRIPTION

Figure 1:
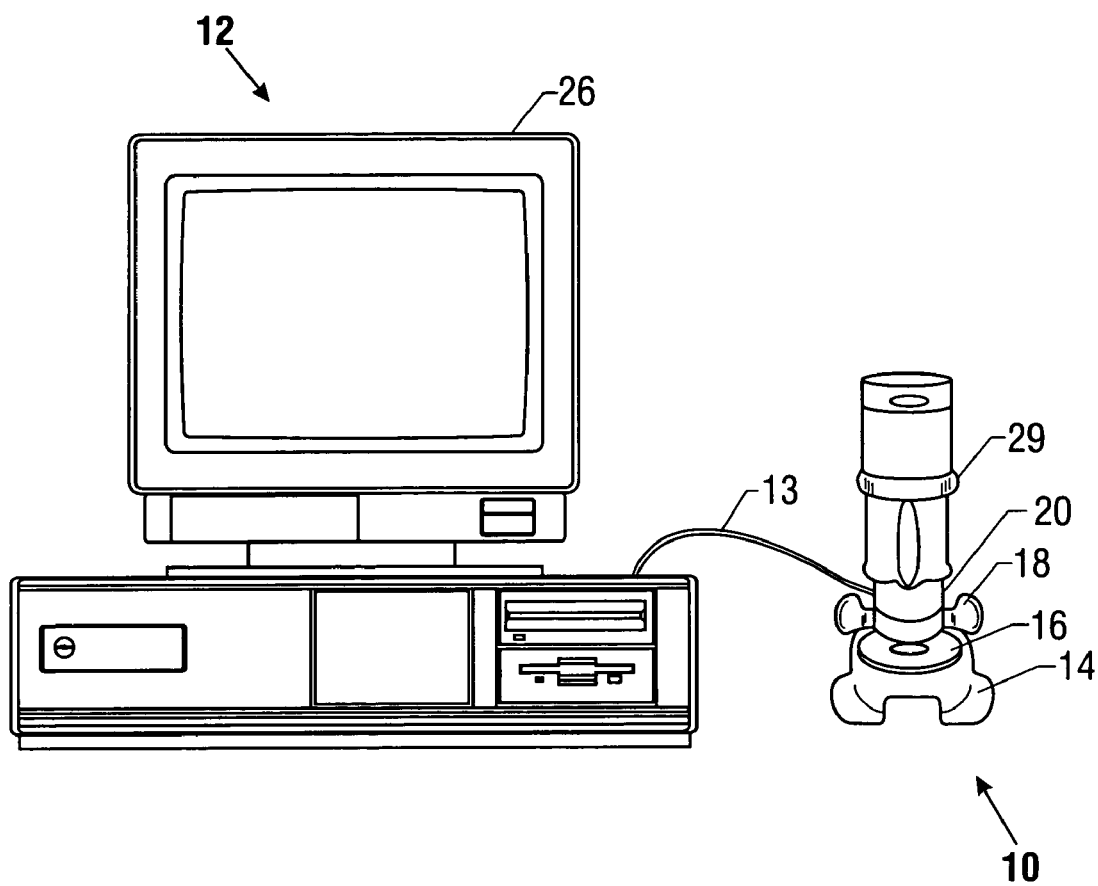
FIG. 1 is a front elevational view of one embodiment of the present invention.

Referring to FIG. 1, a video capture device 10 may be coupled to a host processor-based system 12 using any available connection including a tethered connection 13. A wireless connection may also be used. In the illustrated embodiment, the video capture device 10 is implemented as a microscope. A digital imaging unit 29 in the device 10 develops a digital video stream including a series of video frames. The video frames are displayed on the host processor-based system's display 26. However, the video capture device 10 may be any video capture device including a digital video camera or a scanner.

In an embodiment in which the video capture device 10 is a microscope, the device 10 may include an imaging unit 29 that may include a complementary metal oxide semiconductor (CMOS) imaging sensor in one embodiment of the present invention. The sensor may also be a charge coupled device (CCD) imaging sensor in another embodiment of the present invention. In some embodiments, the imaging unit 29 may capture a digital representation of an imaged object that may be positioned on the sample holder 16 of the device 10. A lens 20 may develop a image for capture by the imaging unit 29. The device 10 may be maintained in an upright orientation by a base 14. A focus adjustment knob 18 enables the optics to be adjusted for different focal lengths.

Figure 2:
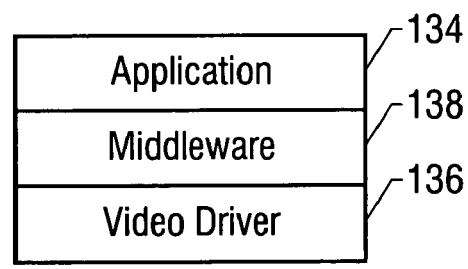
FIG. 2 is a depiction of a software architecture in accordance with one embodiment of the present invention.

In a number of cases, a video device driver may be used on the host processor-based system 12 to handle the video frames from the video capture device 10. The device driver 136, shown in FIG. 2, in turn communicates with application software 134 running the video capture device 10. The application software 134 is conventionally operated on the host processor-based system 12. While an embodiment is described in which the host processor-based system 12 entirely controls the video capture device 10 as if the video capture device were merely a peripheral of the host processor-based system 12, embodiments of the present invention may also use video capture devices which have their own processor-based systems.

In accordance with embodiments of the present invention, a middleware software layer 138 is provided between the device driver 136 and the application software 134 resident on the host processor-based system 12. In a number of cases, the middleware software layer 138 may resolve conflicts between the application software 134 and the device driver 136. As a result, device driver 136 problems may be overcome without requiring that the host processor-based system 12 be rebooted.

To overcome a variety of driver-related problems, the middleware software layer 138 may appear to other software resident on the host processor-based system 12 as if the layer 138 were in fact the device driver 136. Thus, the layer 138 acts as a filter, abstracting the driver functionality, for driver error recovery interfacing with the application 134. In some cases the application 134 may be unaware of driver problems handled by the middleware software layer 138. In one embodiment, the middleware software layer 138 may be a Microsoft DirectShow® component, filter or COM object.

Figure 3:
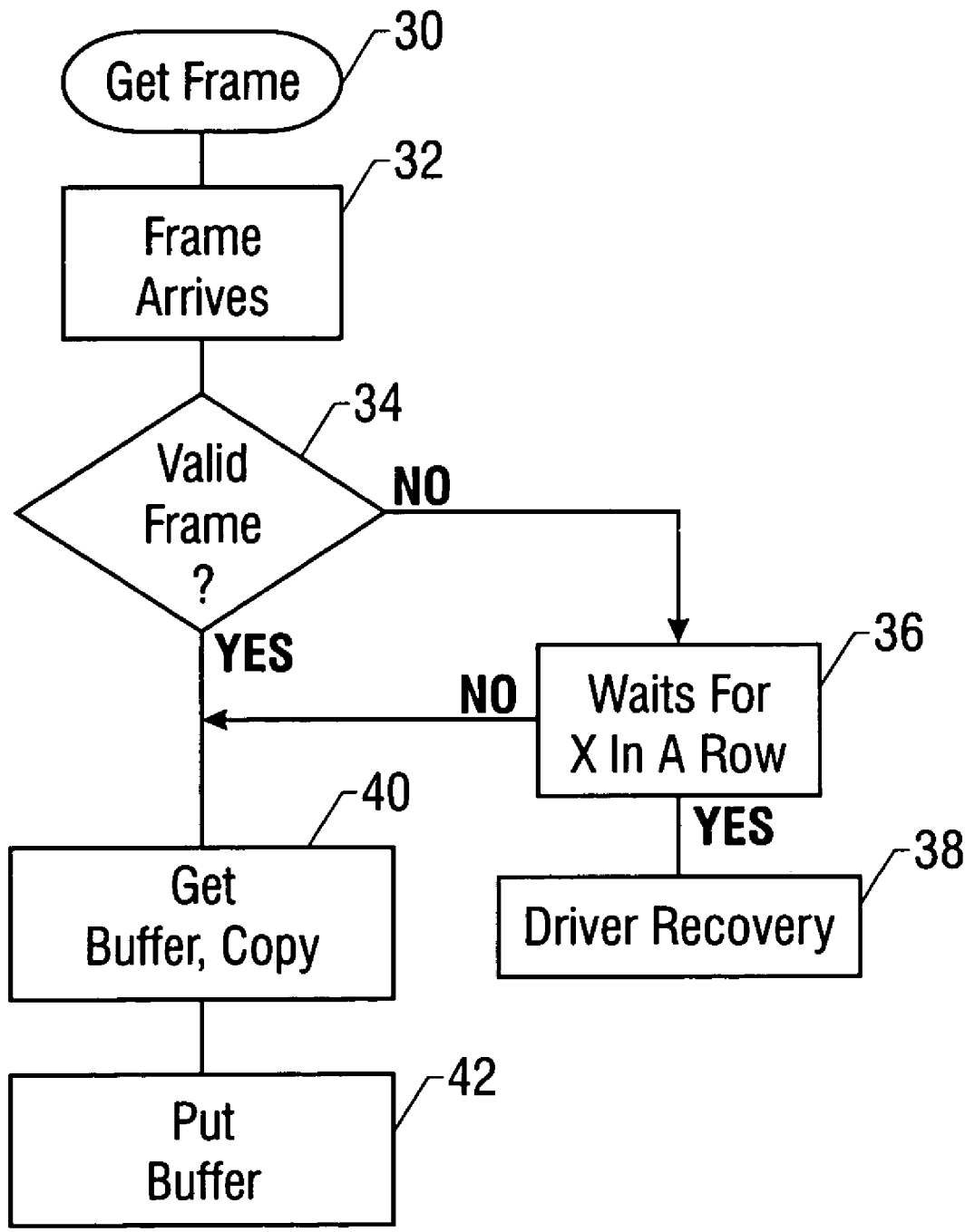
FIG. 3 is a flow chart for software stored on a host processor-based system in accordance with one embodiment of the present invention.

Referring next to FIG. 3, a video frame arrives at the host processor-based system 12 from the video capture device 10 as indicated at block 32. The software 30, which is part of the middleware software layer 138, is responsible for getting frames and forwarding them for buffering. A check at diamond 34 determines whether the frame is valid. The frame may be invalid because the memory size of the frame indicates that a complete frame could not possibly have been received. Alternatively, image analysis may indicate a defect. For example, the bits making up the frame may not be continuous. Alternatively, it may be determined that the frame is all white or all black indicating that the video capture device 10 is attempting to send an error message.

If the video frame is valid, as determined in diamond 34, the video frame may be queued for buffering as indicated at block 40. That is, the software 30 attempts to arrange a buffer from memory. The software 30 then attempts to copy into the buffer the video information making up the frame. To do so, the video frame information is put into a buffer queue as indicated in block 42.

If the frame is not valid, as determined in diamond 34, the flow waits to see if a certain number of invalid frames are received sequentially, as indicated in block 36. If the predetermined number of successive invalid frames have been identified, a driver recovery program 38 is initiated. The driver recovery program 38 is part of the middleware software layer 138. Otherwise, the invalid frame is determined to be an intermittent glitch and the ensuing frames are buffered at blocks 40 and 42.

Figure 4:
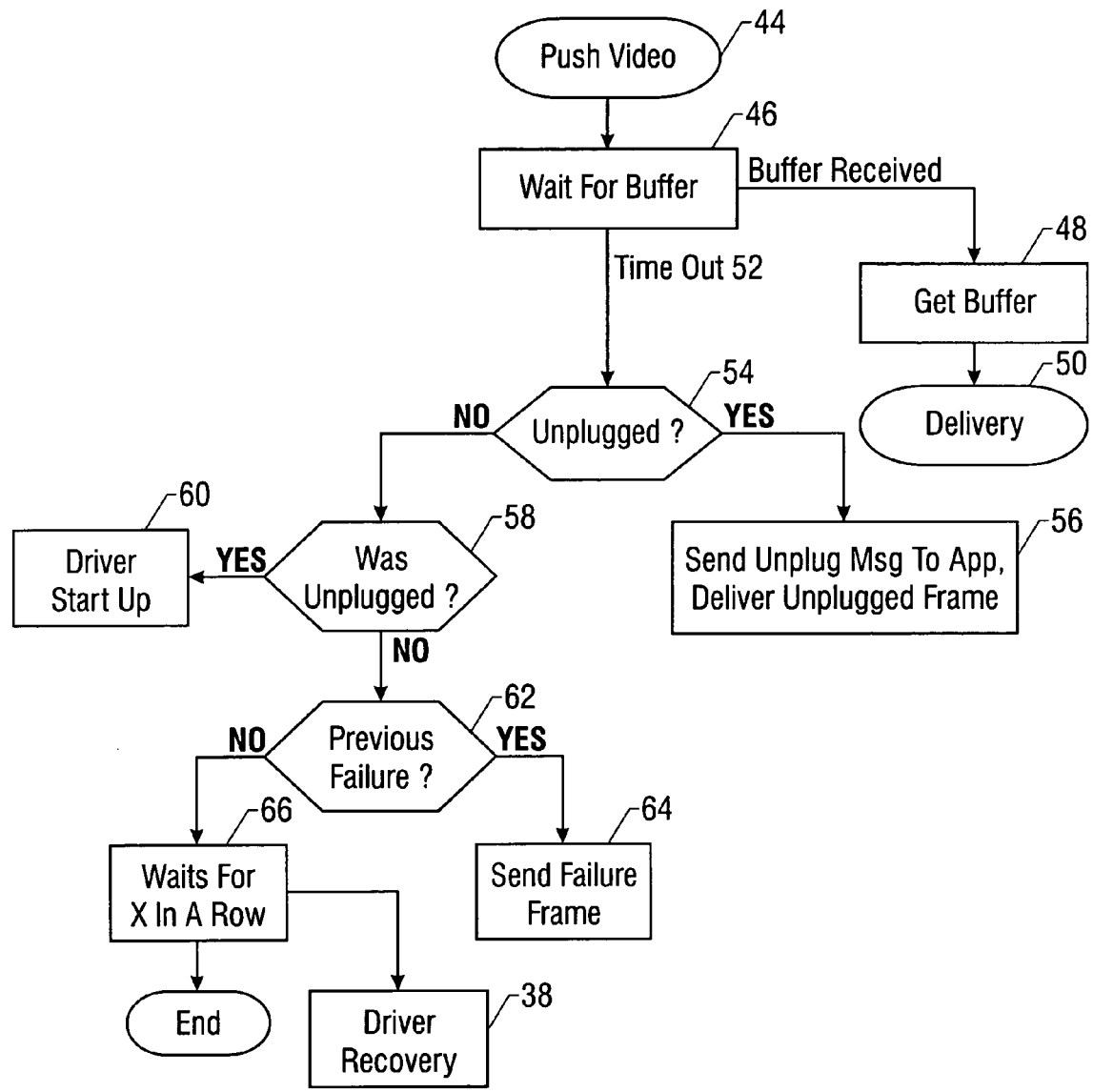
FIG. 4 is a flow chart for software stored on the host processor-based system in accordance with an embodiment of the present invention.

Referring next to FIG. 4, the software 44, also part of the middleware software layer 38, arranges for buffering of the incoming video frame. The software 44 begins by placing the frame in a queue for buffering. The software 44 pushes the video frame to the display 26, if possible. If buffering is possible, a buffer is obtained as indicated in block 48 and the frame is delivered to the display 26 as indicated in block 50.

Otherwise, if a buffer is not available within a predetermined amount of time, a time out 52 occurs. Thus, if successive frames are not received that are available for buffering, within a predetermined time, a time out occurs indicating that a problem has arisen. For example, in one embodiment of the present invention, if successive frames are not received within one half second of one another, a time out 52 may occur.

An initial check at diamond 54 determines whether or not the video capture device 10 is unplugged from the host processor-based system 12. If so, an "unplugged" message may be sent to the application 134 resident on the host processor-based system 12 and an "unplugged" frame of video may be delivered to the display 26. That is, instead of merely generating a notification in the form of an error message, the middleware software layer 138, in accordance with one embodiment of the present invention, may actually incorporate the error message into a video frame that is displayed in an appropriate message box on the display 26.

Figure 5:
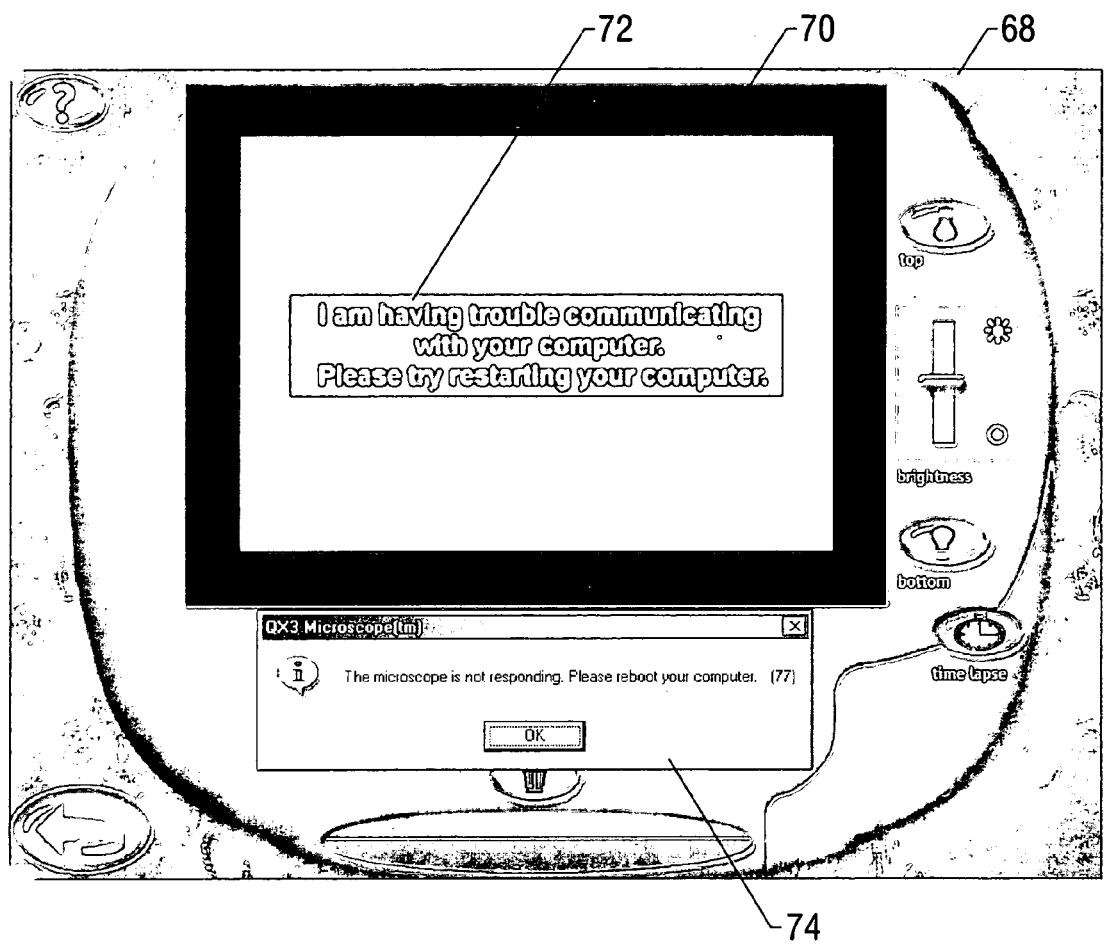
FIG. 5 is a graphical user interface that may be displayed on a display associated with the host processor-based system in accordance with one embodiment of the present invention.

For example, referring to FIG. 5, when a driver error occurs, the graphical user interface 68 is displayed. The interface 68 includes a colored border 70 that indicates information about the nature of the error. Particularly, in some embodiments of the present invention, the color of the border 70 may provide error information. In addition, because the application 134 is also notified of the error, the application 134 may notify the user, through a dialog box 74 for example, that there is an error.

Unplugging may be detected in a variety of ways or using a combination of inquiries. For example, a configuration data base such as the Microsoft Windows Registry may be read via a driver notification or by the operating system to determine if the device 10 has been properly connected and recognized by the system 12.

It may be advantageous in many cases to enable the middleware software layer 138 to report the errors as video frames. The middleware software layer 138 may be able to detect and report the errors to any application using the video capture device 10. All applications may then have the ability to use the driver level error notification system because no device specific protocol must be learned. No special protocol is necessary to operate the error reporting protocol since the protocol exists in the middleware at the device driver level. Effectively, the protocol is part of the device driver and thus there is no need to learn a special error reporting protocol for a particular type of device such as the video capture device 10.

Returning to FIG. 4, a check at block 58 determines whether the video capture device 10 was previously unplugged. If so, the flow transfers to the driver start up software 60, another component of the middleware software layer 138. If the device 10 was not unplugged, the next check determines whether there have been previous failures as indicated in block 62. If so, a failure video frame may be displayed as a graphical user interface 68 (FIG. 5). Again, the failure information may be color coded as indicated in FIG. 5 to provide information about the nature of the failure.

If none of those types of problems are uncovered, in block 66, the flow waits for a certain number of timeouts in a row. If any frame is received, the flow ends and the frame is displayed. If no frame is received, the driver recovery program 38 is initiated.

Figure 6:
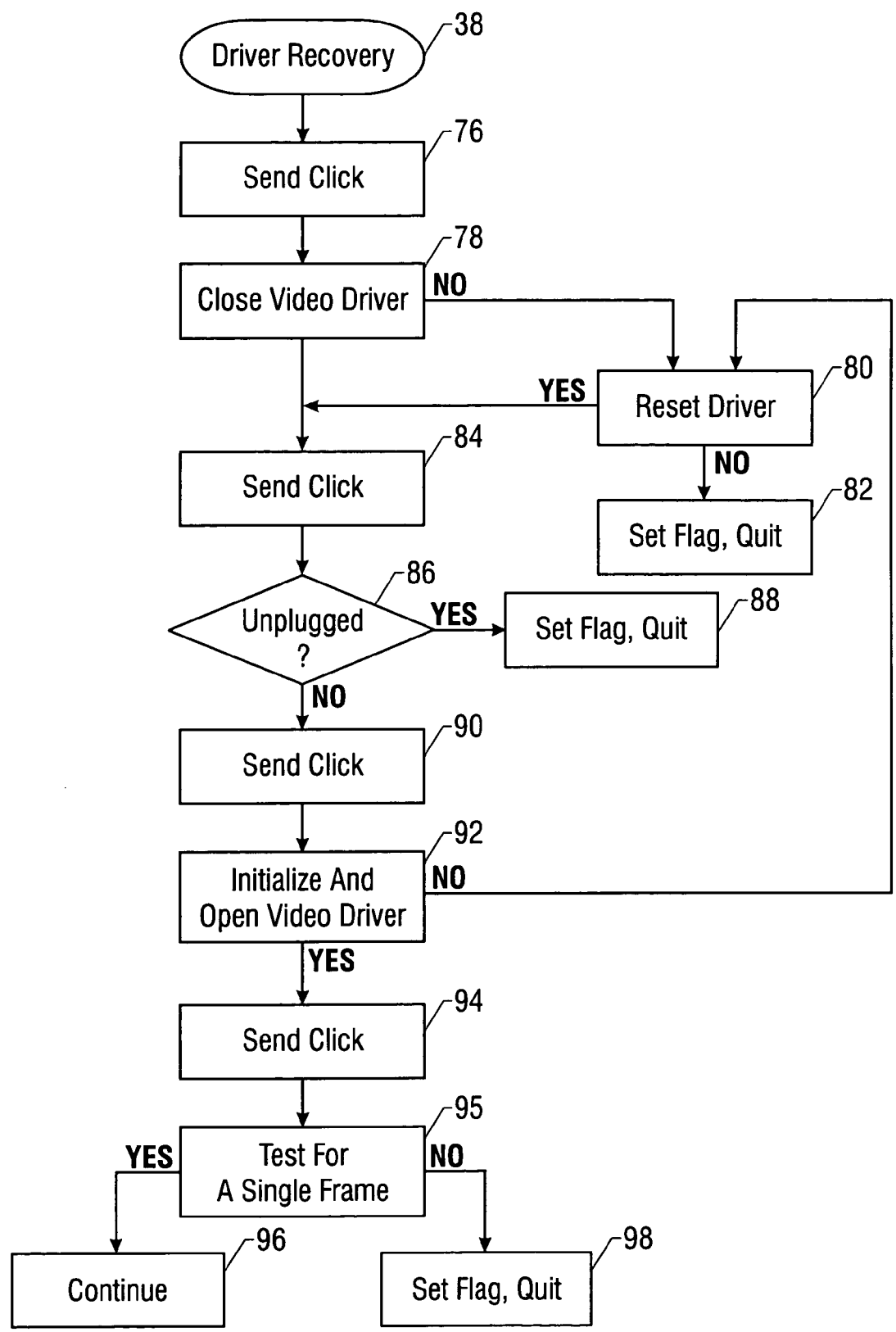
FIG. 6 is a flow chart for software which is resident on the host processor-based system in accordance with one embodiment of the present invention.

Moving next to FIG. 6, the driver recovery program 38 is also part of the middleware software layer 138. The program 38 begins by sending stage information to the display 26 as indicated in block 76. The stage information may include information about what stages of the program 38 have been successfully traversed. Since the driver recovery program 38 may be subject to failure (because obviously problems already exist), it is desirable to know where, in the driver recovery flow, the failure occurs.

Figure 7:
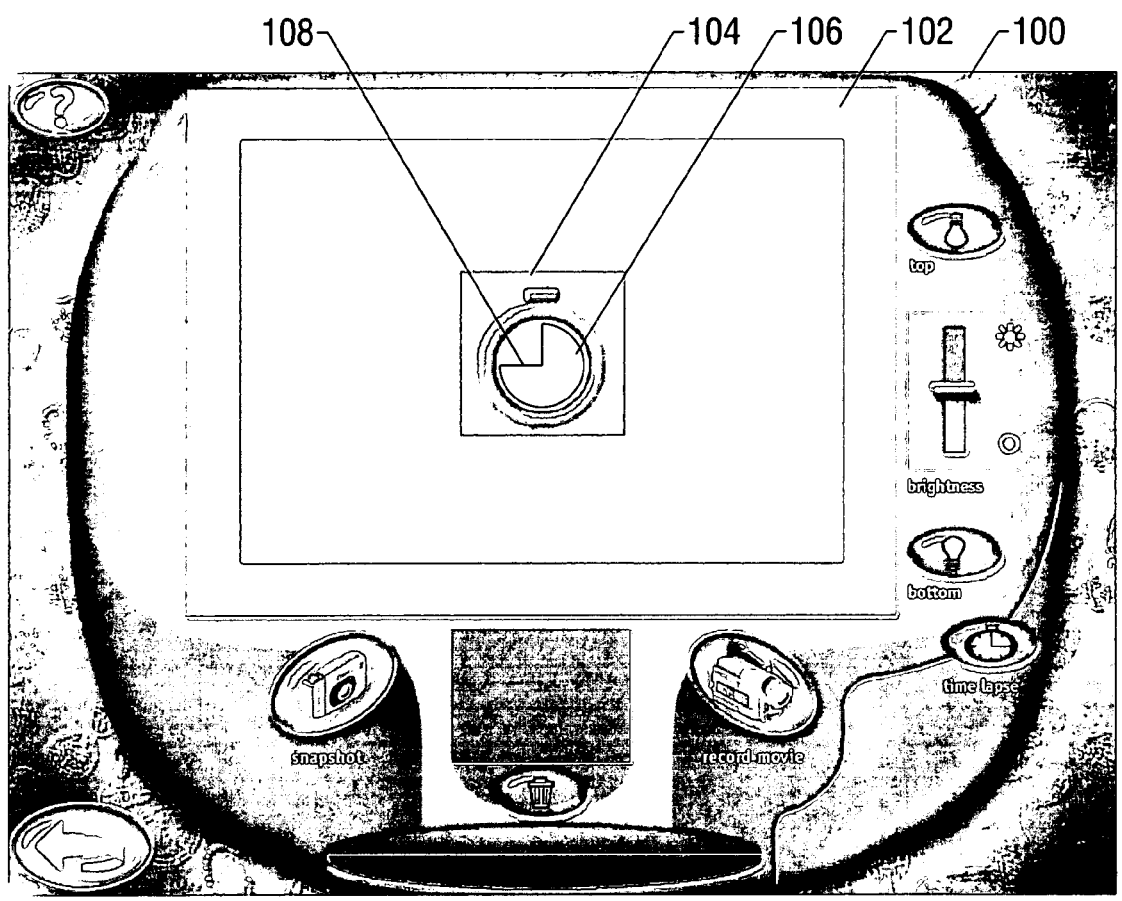
FIG. 7 is another graphical user interface that may be displayed on the display of the host processor-based system in accordance with one embodiment of the present invention.

Thus, referring to FIG. 7, a graphical user interface 100 may be generated when the driver recovery program 38 is initiated. Each time the flow passes a send click indicator, as indicated for example at block 76, a clock image 104 may be incremented as an example. The clock image 104 may display four different stages represented as the times 12:00, 3:00, 6:00 and 9:00. As initially displayed at block 76, the clock image 104 is at 12:00 (or 106). This specifically identifies the location where a failure occurs (before block 84) if no further "movement" of the clock image 104 occurs. As a result, the user may provide very specific information about exactly where the error recovery flow stopped and may give error message information in terms of a border 102 color.

Continuing in FIG. 6, after sending the stage information at block 76, the video driver is closed as indicated in block 78. If the video driver is successfully closed, the next click indicator is sent as indicated in block 84. At this point the clock image 104 displays 3:00.

If it was not possible to close the driver, an attempt to reset or clear the driver is implemented as indicated in block 80. If that is successful, the flow returns and the stage information is indicated at block 84. Otherwise, a flag is set and the flow stops (block 82).

A number of different techniques may be utilized to reset the driver. The driver stack may be reinitialized. Alternatively, the driver may be queried for a live status by sending test frames. As another alternative, one may attempt to load and unload the driver from the operating system. As still another alternative, the user may be prompted to replug in the connected video capture device 10. Thus, the flow may automatically increment through each of these techniques to see if the driver can be reset.

A check at diamond 86 determines whether the video capture device 10 is unplugged. If so, a flag is set as indicated in block 88 and the flow quits. If the driver needs to be recovered because the video is unplugged, there is really no need to continue with the rest of the flow which reopens the driver. Thus, if the device is not unplugged, the stage information is provided as a clock image 104 (e.g. 6:00) to the video display 26, as indicated at block 90.

At block 92, the video driver is initialized and opened. If this fails, the flow proceeds back to the block 80 to attempt to start the driver. If driver initialization is successful at block 92, the next stage information (9:00) is displayed (as indicated at 108 in FIG. 7), as indicated in block 93.

A test occurs in block 95 for a single frame. The single frame test forces a single frame to pass through the video buffer stream. The flow looks at the quality of that frame. In this way, if a suitable frame is obtained, the video stream may be started. If a suitable frame is not obtained, then the flow returns to the software 44 to attempt to solve the problem. However, the unfortunate situation where a number of video frames are lost because the driver is still not operating correctly is avoided. Moreover, if the test is successful (or unsuccessful) the user may be given a quicker notification of the nature of the problem.

Thus, if the single frame test is successful, the flow continues (block 96). Conversely, if it fails, the driver recovery program 38 sets a flag and quits. The next time a timeout 52 occurs, the check at previous failure block 62 (FIG. 4) will pick up the flag previously set by the driver recovery program 38 and the push video software 44 may send a failure frame (block 64, FIG. 4).

Figure 8:
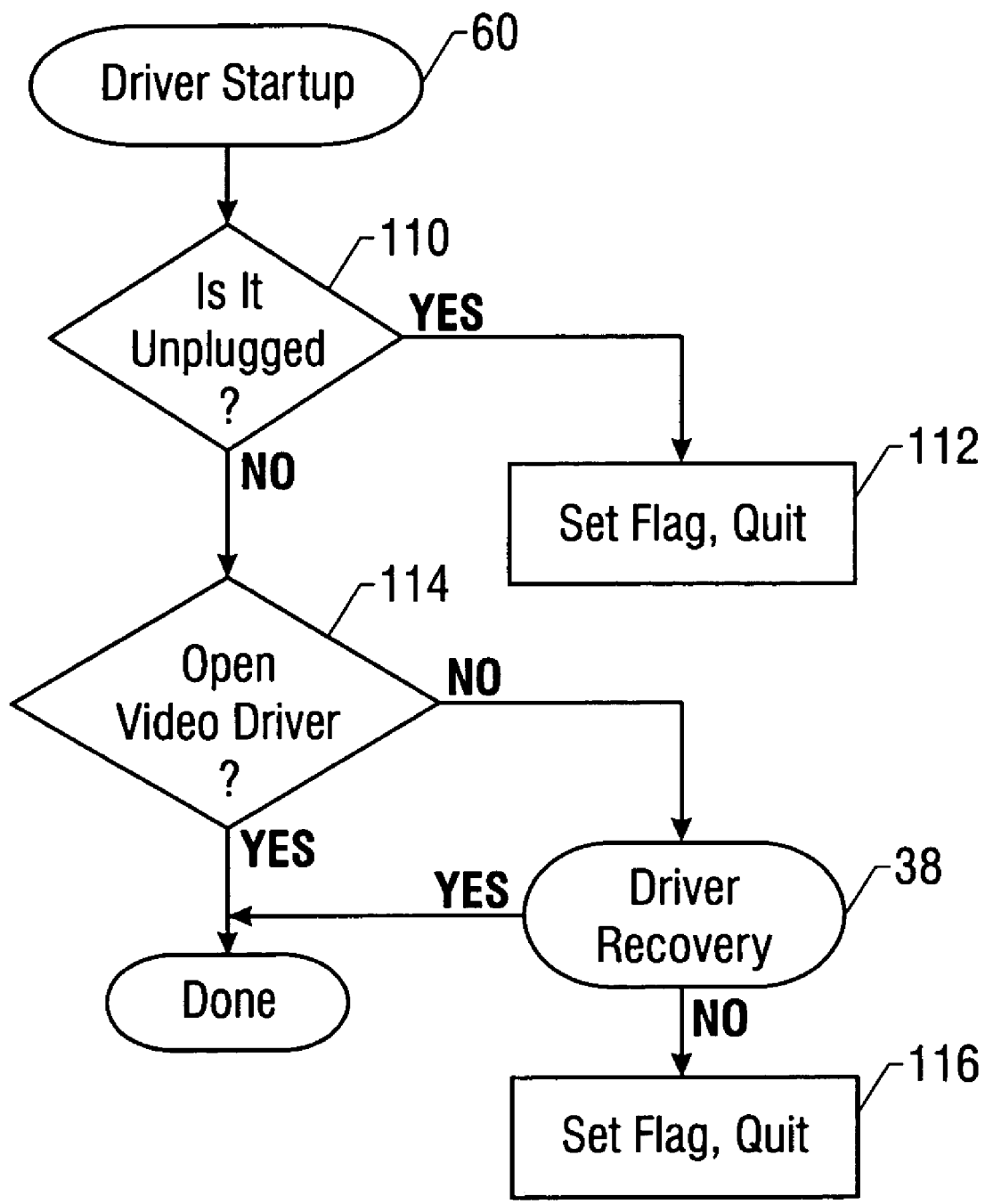
FIG. 8 is a flow chart for software also resident on the host processor-based system in accordance with one embodiment of the present invention.

Every time the user enters the video display mode, the driver start up software 60 may be initialized as indicated in FIG. 8, in accordance with one embodiment of the present invention. If the video capture device 10 is unplugged as determined in diamond 110, a flag is set and the flow quits (block 112). If the device 10 is in fact plugged in, the device driver is opened as indicated in block 114. If the device driver is successfully opened, the flow is done. Otherwise, the flow transitions to the driver recovery program 38 shown in FIG. 6. If the driver recovery software 38 fails to recover the driver, the driver start up flow ends and a flag is set (block 116). If successful, the driver is restarted and the driver start up program completes. Each time a flag is set again, it may trigger different operations in push video software 44 (FIG. 4, in ensuing frames).

Figure 9:
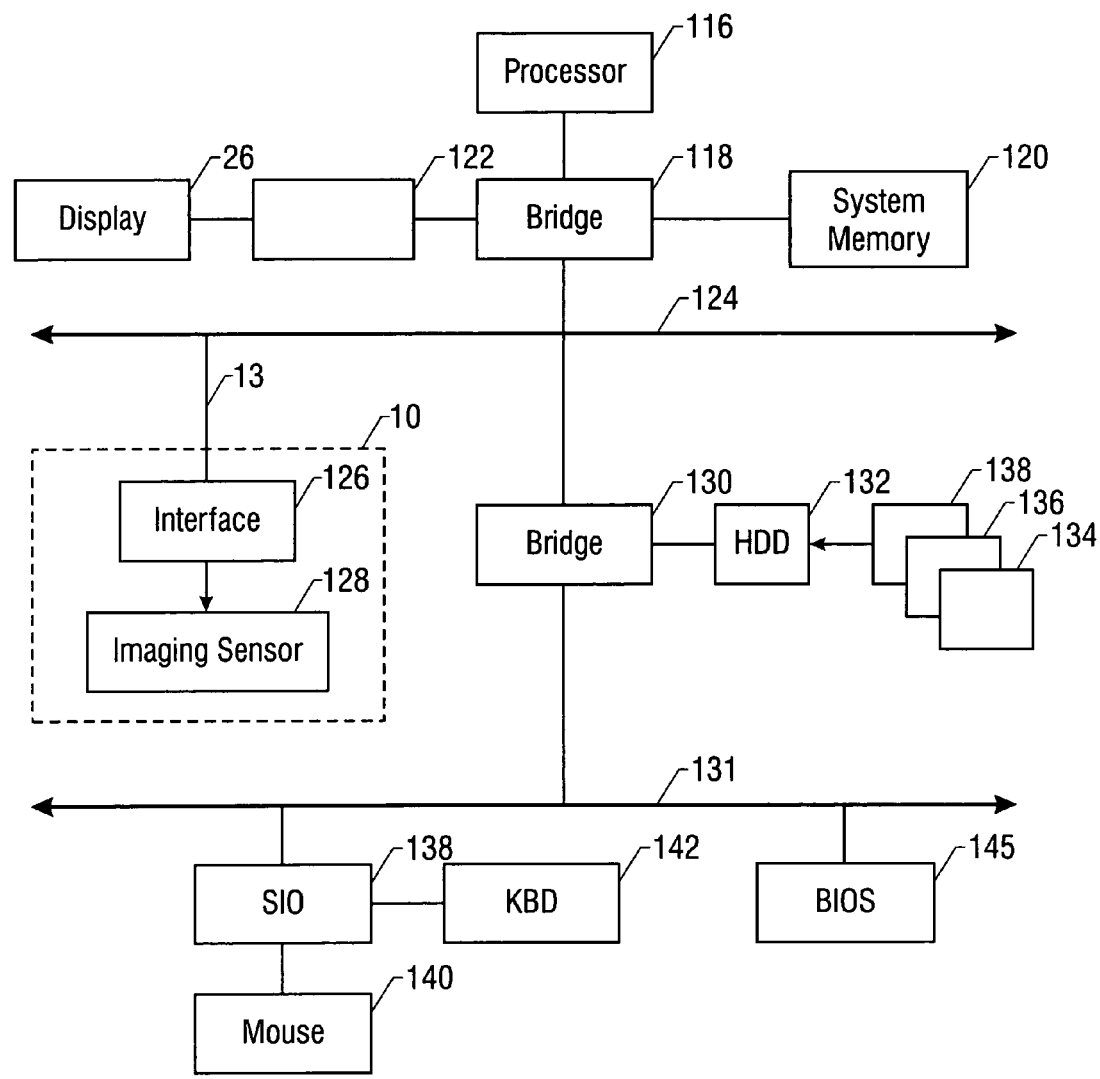
FIG. 9 is a block diagram of the embodiment shown in FIG. 1.

One hardware implementation of the present invention, shown in FIG. 9, includes a processor 116 coupled to a bridge 118. The bridge 118 is coupled between system memory 120 and graphics accelerator 122. The display 26 may be coupled to the graphics accelerator 122.

The bridge 118 also couples a bus 124 in turn coupled to the video capture device 10 through the cable 13. The capture device 10 includes imaging sensor 28 and its interface 126. The interface 126 may itself include a processor for conducting analyses on digital representations of the image detected by the device 10.

In one embodiment, a second bridge 130 couples a hard disk drive 132 or other non-volatile storage. The drive 132 may store the application software 134, middleware software layer 138 and video driver 136 for eventual transfer to the system memory 120.

The bridge 130 is also coupled to another bus 131 which couples conventional devices such as a keyboard 142 and a mouse 140 through a serial input/output (SIO) device 138. A binary input/output (BIOS) 145 may also be coupled to the bus 131.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   determining whether there is a video driver error during normal operation of a system;
   if a video driver error is determined, causing an error recovery program to progress through at least two stages of said recovery program; and
   after the completion of each of said at least two stages, causing said error recovery program to send a message for display on a video display to indicate the successful completion of the respective stage.

2. The method of claim 1 further including:
   providing a middleware software layer between an application and a video driver; and
   when said video driver fails, using said middleware software layer to recover said video driver.

3. The method of claim 1 including using a middleware software layer between said video display and an application to cause said message to be sent after said each stage.

4. The method of claim 1 including attempting to close said video driver and if said video driver can not be closed, attempting to reset said video driver.

5. The method of claim 1, further comprising determining whether there is a video driver error during display of video data from a video capture device coupled to the system.

6. The method of claim 5, further comprising using the video capture device to report the video driver error to an application program.

7. The method of claim 1, further comprising sending a second message to indicate the video driver error for display on the video display from an application program.

8. The method of claim 1, wherein a first stage of the at least two stages comprises attempting to close a video driver.

9. The method of claim 8, further comprising attempting to reset the video driver if the video driver was unable to be closed.

10. A computer-readable medium storing instructions that when executed enable a processor-based system to:
    determine whether there is a video driver error during operation of the system other than a booting of said system;
    if a video driver error is determined, cause a recovery program to progress through at least two stages; and
    after the completion of each of said at least two stages, cause said error recovery program to send a display message for display on a video display to indicate the completion of the respective stage.

11. The medium of claim 10 further storing instructions that when executed enable the processor-based system to communicate with a middleware software layer that acts as a filter to abstract the video driver.

12. The medium of claim 11 further storing instructions that when executed enable the processor-based system to attempt to close said video driver and if said driver can not be closed, attempt to reset said video driver.

13. The medium of claim 10 further comprising instructions that when executed enable the system to determine whether there is a video driver error during display of video data from a video capture device coupled to the system.

14. The medium of claim 13 further comprising instructions that when executed enable the system to use the video capture device to report the video driver error to an application program.

15. The medium of claim 10 further comprising instructions that when executed enable the system to send a second message to indicate the video driver error for display on the video display from an application program.

16. The medium of claim 10 further comprising instructions that when executed enable the system to attempt to close a video driver.

17. The medium of claim 16 further comprising instructions that when executed enable the system to attempt to reset the video driver if the video driver was unable to be closed.

18. A system comprising:
   a processor; and
   a storage coupled to said processor to store instructions that if executed enable said processor to determine whether there is a video driver error and if a video driver error has been detected during normal operation of a system, cause an error recovery program to progress through at least two stages and after the completion of each stage, cause said error recovery program to send a display message for display on a video display to indicate the successful completion of the stage.

19. The system of claim 18 wherein said storage further stores instructions that if executed enable the processor to execute software which communicates between an application program and a video driver and if the video driver fails, execute said software to recover said driver.

20. The system of claim 18 wherein said storage further stores instructions that if executed enable the processor to:
   detect a video driver error; and
   execute software that acts as a middleware between an application and a video driver to recover said video driver.

21. The system of claim 18 further including a video capture device coupled to said processor.

22. The system of claim 21 wherein said video capture device is a digital imaging microscope.

23. The system of claim 18 including a display coupled to said processor.

24. The system of claim 18 wherein said storage stores instructions that if executed enable the processor to attempt to close said video driver when the video driver error has been detected and, if said video driver can not be closed, attempt to reset said video driver.

25. The system of claim 18, wherein the storage further stores instructions that if executed enable the processor to determine whether there is a video driver error during display of video data from a video capture device coupled to the system.

26. The system of claim 25, wherein the storage further stores instructions that if executed enable the processor to use the video capture device to report the video driver error to an application program.

27. The system of claim 18, wherein the storage further stores instructions that if executed enable the processor to send a second message to indicate the video driver error for display on the video display from an application program.

28. The system of claim 18, wherein the storage further stores instructions that if executed enable the system to attempt to close a video driver.

29. The system of claim 28, wherein the storage further stores instructions that if executed enable the processor to attempt to reset the video driver if the video driver was unable to be closed.

* * * * *